Figure 1:
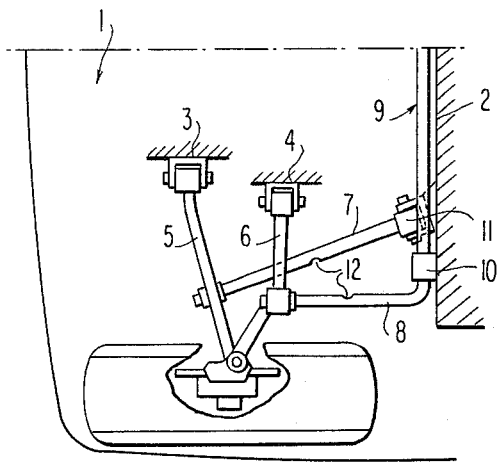

United States Patent [19]

Huber

[11] 4,334,693
[45] Jun. 15, 1982

[54] INDEPENDENT FRONT WHEEL SUSPENSION FOR MOTOR VEHICLES

[75] Inventor: Guntram Huber, Aidlingen, Fed. Rep. of Germany

[73] Assignee: Daimler-Benz Aktiengesellschaft, Stuttgart, Fed. Rep. of Germany

[21] Appl. No.: 82,936

[22] Filed: Oct. 9, 1979

[30] Foreign Application Priority Data

Oct. 18, 1978 [DE] Fed. Rep. of Germany ....... 2845345

[51] Int. Cl.³ .............................................. B60G 3/00
[52] U.S. Cl. ................... 280/95 R; 280/660; 280/690
[58] Field of Search ............ 280/95 R, 96.1, 660, 280/663, 689–696, 784, 665; 188/1 C; 74/492

[56] References Cited

U.S. PATENT DOCUMENTS

| 3,424,263 | 1/1969 | Black | 74/492 |
| 3,545,299 | 12/1970 | Scherenberg | 74/492 |
| 3,813,961 | 6/1974 | Hug | 74/492 |
| 3,831,970 | 8/1974 | Müller | 280/665 |
| 3,934,897 | 1/1976 | Moos | 280/750 |
| 4,022,495 | 5/1977 | Pizzocri | 188/1 C |
| 4,098,141 | 7/1978 | Yamaguchi | 74/492 |

Primary Examiner—Robert R. Song
Attorney, Agent, or Firm—Craig and Antonelli

[57] ABSTRACT

An independent front wheel suspension for motor vehicles with at least one wheel guide structure that includes a longitudinal guide member extending in the vehicle longitudinal direction toward the vehicle end wall and pivotally connected within the area thereof; the longitudinal guide member is constructed as element deformable under compression with a predetermined deformation characteristic.

6 Claims, 6 Drawing Figures

U.S. Patent  Jun. 15, 1982  4,334,693

INDEPENDENT FRONT WHEEL SUSPENSION FOR MOTOR VEHICLES

The present invention relates to an independent wheel suspension for motor vehicles, especially for passenger motor vehicles, with at least one wheel guide member that includes a longitudinal guide arm or link extending in the vehicle longitudinal direction toward the vehicle front wall or dash and pivotally connected in the area thereof.

Wheel guide members are customarily supported with respect to the vehicle frame or the vehicle body by way of elastic pivotal connections such as rubber bushes or the like in order to absorb vibrations and noises, but in themselves they are constructed as form-rigid as possible, and more particularly with a view toward a safe absorption of all forces occurring in the wheel guidance. Very high safeties are provided thereby as regards the dimension in order to preclude under all circumstances a failure of wheel guide members and therewith a steering incapability of the vehicle. The consequence of such a construction is that longitudinal guide arms or links directed toward the front wall and pivotally connected in the area thereof, in case of a collision frequently cause heavy damages in the front wall area, respectively, penetrate through the end wall or dashboard into the vehicle interior space if the front section structure of the vehicle is correspondingly far-reachingly deformed.

The present invention is concerned with the task to so construct the front wheel suspension that such damages of the vehicle front wall area, respectively, injuries of the passengers by way of suspension parts penetrating into the passenger space are avoided.

The underlying problems are solved according to the present invention with a wheel suspension of the aforementioned type in that an element deformable under compression with predetermined deformation characteristic is provided as longitudinal guide arm or link. Such a construction of the longitudinal guide arm enables a construction without impairment of the safety of the wheel guidance to the effect that, on the one hand, in case of forces lying substantially above the wheel guide forces, a deformation of the longitudinal guide elements occurs with certainty and that, on the other hand, consequential damages are far-reachingly avoided by the type of the deformation. In particular also an alternate matching may be undertaken in connection with front section structures which are designed for certain deformations to dissipate impact-energy in case of a collision so that notwithstanding the deformation of the longitudinal guide elements or arms possibly the initial wheel position remains far-reachingly preserved.

Especially in conjunction with longitudinal guide elements constructed as compression rods or struts, desired deformation characteristics can be achieved thereby in a particularly simple manner in that the compression rigidity or compressive strength is limited by cranks, notches, constrictions, shear connections or frictional connections.

Accordingly, it is an object of the present invention to provide an independent front wheel suspension for motor vehicles which avoids by simple means the aforementioned shortcomings and drawbacks encountered with the prior art constructions.

Another object of the present invention resides in an independent front wheel suspension for motor vehicles which is capable of reliably absorbing all guide forces that normally occur, yet prevents serious damages and possibly injuries in case of a series front collision.

A further object of the present invention resides in an independent front wheel suspension for motor vehicles in which serious damages at the front end wall or even a penetration of the longitudinal guide elements through the front end wall into the vehicle interior space is far-reachingly precluded in case of collision causing the front section of the vehicle to be correspondingly crushed.

A still further object of the present invention resides in an independent wheel suspension for vehicles, in which a deformation of the longitudinal guide element occurs with certainty during the occurrence of forces above the wheel guide forces.

Figure 2:
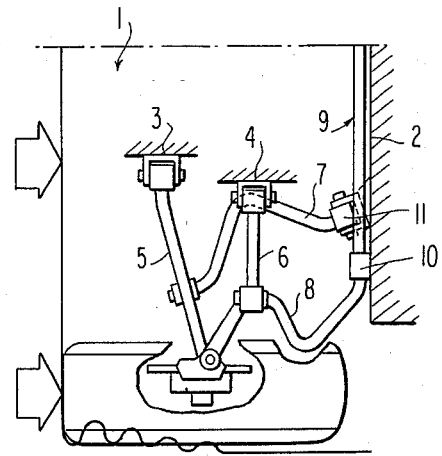
Figure 3:
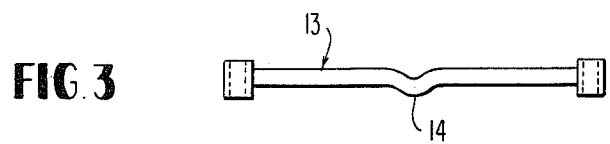

These and other objects, features and advantages of the present invention will become more apparent from the following description when taken in connection with the accompanying drawing which shows, for purposes of illustration only, several embodiments in accordance with the present invention and wherein:

FIG. 1 is a schematic plan view on a front section of a passenger motor vehicle with a front wheel suspension in accordance with the present invention;

FIG. 2 is a schematic plan view on the front section of the passenger motor vehicle according to FIG. 1 after a front-end collision with buckled longitudinal guide members of the wheel guide structure; and FIGS. 3 to 6 are plan views on several embodiments of longitudinal guide members according to the present invention in the form of compression rods with predetermined deformation characteristics.

Referring now to the drawing wherein like reference numerals are used throughout the various views to designate like parts, the front section generally designated by reference numeral 1 of a passenger motor vehicle is shown in the schematic illustrations according to FIGS. 1 and 2 as to its contours, which is far-reachingly delimited on the rear side by the end wall 2 of the vehicle, such as the dash or fire wall, and which forms by means of its bearers and the like not illustrated in detail, such as bearers 3 and 4 only schematically indicated, the support for cross-guide arms or elements 5 and 6 of triangularly-like wheel-guide members whose longitudinal guide arms 7 and 8 extend toward the end wall 2 and are pivotally connected at the same or within the area thereof. The cross-guide arms 5 and 6 are connected to the wheel carrier at their outer ends which is not shown in detail, and are connected intermediate their connecting places with the wheel carrier and their pivotal connection at the vehicle front section, with the forward ends of the longitudinal guide arms 7 and 8, whereby the longitudinal guide element 8 coordinated to the upper wheel guide member 6, 8 is formed by one of the arms of a U-shaped stabilizer generally designated by reference numeral 9, whose web extends essentially parallel to the end wall 2. In the illustrated embodiment, the stabilizer 9 is thereby pivotally connected preferably elastically at the end wall 2 in the usual manner, as indicated schematically by the pivotal connection 10. The rear pivotal connection 11 of the longitudinal guide arm 7 coordinated to the lower wheel guide member 5, 7 is also coordinated to the end wall 2.

The longitudinal elements or arms 7 and 8 form compression rods in the illustrated embodiment according to FIGS. 1 and 2, which are each provided with a notch 12 for purposes of attaining a predetermined deformation characteristic, whereby it is achieved by the notches 12 that in case of a vehicle front section deformation in the case of a collision during a front end impact—as illustrated in FIG. 2—the longitudinal guide arms 7 and 8 buckle by an amount corresponding to the length reduction of the front section 1, whence damages of the end wall 2 or even a penetration of the longitudinal guide elements 7, 8 beyond the end wall 2 into the vehicle passenger space are avoided. In particular, the deformation characteristic of the longitudinal guide arms 7 and 8 can be so matched to the vehicle front section deformation that in relation to a front end impact, as shown in FIG. 2, the base position of the wheels is essentially preserved notwithstanding the deformation of the longitudinal guide arms 7 and 8.

With a view toward the attainment of a desired deformation characteristic, the longitudinal guide elements constructed as compression rods may have different constructions within the scope of the present invention. FIGS. 3 to 6 illustrate examples therefor, whereby in FIG. 3 the longitudinal guide element 13 is provided with a crank 14.

Figure 4:
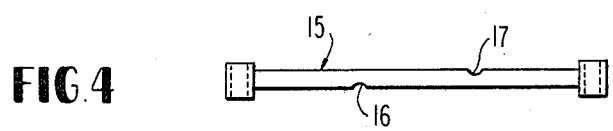

In the case of the construction according to FIG. 4, the longitudinal guide element 15 is provided with two notches 16 and 17 which, with a spacing to one another, are coordinated to opposite sides of the longitudinal guide element 15 so that in case of a compression stress which leads to a buckling of the longitudinal guide element 15, a double-folding thereof results.

Figure 5:
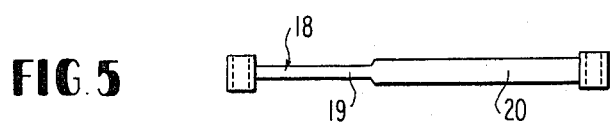

In the illustration according to FIG. 5, a longitudinal guide element 18 is provided which has different cross sections over its length areas 19 and 20 and which is correspondingly deformed during compression at least initially essentially only within the area 19 of the lesser cross section.

Figure 6:
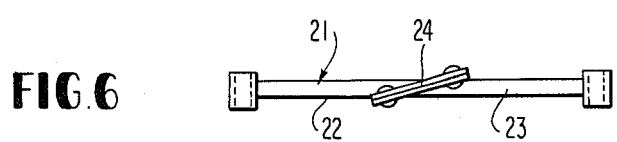

Further possibilities according to the present invention for the construction of longitudinal guide elements in the form of compression rods with predetermined deformation characteristics reside, inter alia, in constructing the guide element or arm subdivided, as shown in FIG. 6 for the guide element generally designated by reference numeral 21, and to connect the two parts 22 and 23 of the longitudinal guide element 21 with each other by a shear connection 24 of any known construction. In a further manner not illustrated herein, it is also possible to provide a frictional connection of any known construction between the two parts of a guide element subdivided in the longitudinal direction, which permits that the portions of the guide element displace toward one another, especially slide one within the other, upon exceeding a predetermined compression force.

While I have shown and described several embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An independent wheel suspension for a motor vehicle, characterized in that the independent front wheel suspension comprises at least two cross guide arms connected to a vehicle support member and to a wheel carrier, a guide element extending in a vehicle longitudinal direction is connected to each cross guide arm and at the vehicle end wall, one end of each of the guide elements is respectively connected to the cross guide arm at a position intermediate the vehicle support member and the wheel carrier, the second end of each of the guide elements is pivotally connected within an area of the vehicle end wall, each of the longitudinal guide elements includes means for enabling the guide element to deform under compression with a predetermined deformation characteristic, and in that one of the guide elements is an arm of a U-shaped stabilizer pivotally connected to the vehicle end wall.

2. An independent wheel suspension according to claim 1, characterized in that each of the longitudinal guide elements is constructed as compression rod.

3. An independent wheel suspension according to one of claims 1 or 2, characterized in that the enabling means includes at least one crank provided in each of the guide elements.

4. An independent wheel suspension according to one of claims 1 or 2, characterized in that the enabling means includes at least one notch provided in each of the guide elements.

5. An independent wheel suspension according to one of claims 1 or 2, characterized in that the enabling means includes at least one constriction provided in each of the guide elements.

6. An independent wheel suspension according to one of claims 1 or 2, characterized in that each of the longitudinal guide elements is constructed multi-partite and includes at least two partial sections disposed one behind the other.

* * * * *